US011153289B2

(12) United States Patent
Jiang

(10) Patent No.: US 11,153,289 B2
(45) Date of Patent: Oct. 19, 2021

(54) SECURE COMMUNICATION ACCELERATION USING A SYSTEM-ON-CHIP (SOC) ARCHITECTURE

(71) Applicant: ALIBABA GROUP HOLDING LIMITED, Grand Cayman (KY)

(72) Inventor: Xiaowei Jiang, San Mateo, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 225 days.

(21) Appl. No.: 15/663,616

(22) Filed: Jul. 28, 2017

(65) Prior Publication Data

US 2019/0036893 A1      Jan. 31, 2019

(51) Int. Cl.
*H04L 29/06* (2006.01)
*G06F 21/60* (2013.01)
(Continued)

(52) U.S. Cl.
CPC ........ *H04L 63/0485* (2013.01); *G06F 13/128* (2013.01); *G06F 13/4282* (2013.01);
(Continued)

(58) Field of Classification Search
CPC . H04L 63/0485; H04L 63/164; H04L 63/166; H04L 63/168; H04L 9/0631; H04L 9/302; H04L 9/3066; G06F 13/128; G06F 13/4282; G06F 21/602; G06F 21/606; G06F 2213/0026
See application file for complete search history.

(56) References Cited

U.S. PATENT DOCUMENTS

| 6,725,371 | B1 * | 4/2004 | Verhoorn, III | ...... H04L 63/0485 |
| | | | | 713/161 |
| 7,685,436 | B2 * | 3/2010 | Davis | ...................... G06F 21/72 |
| | | | | 713/153 |

(Continued)

OTHER PUBLICATIONS

L. You-guo and J. Ming-fu, "The Reinforcement of Communication Security of the Internet of Things in the Field of Intelligent Home through the Use of Middleware," 2011 Fourth International Symposium on Knowledge Acquisition and Modeling, Sanya, 2011, pp. 254-257. (Year: 2011).*

(Continued)

*Primary Examiner* — Robert B Leung
*Assistant Examiner* — Sameera Wickramasuriya
(74) *Attorney, Agent, or Firm* — Finnegan, Henderson, Farabow, Garrett & Dunner, LLP

(57) ABSTRACT

A System-on-Chip (SoC) performs secure communication operations. The SoC may include a peripheral interface configured to communicate with a host system. The SoC may also include a network interface configured to receive network packets in a secure communication session. The SoC may further include a processor configured to execute an Operating System (OS) software and a secure communication software stack to process at least one received network packet in the secure communication session. In addition, the SoC may include a secure communication engine configured to perform cryptographic operations and generate at least one decrypted packet in the secure communication session. The at least one decrypted packet may be provided to the host system via the peripheral interface.

16 Claims, 6 Drawing Sheets

(51) Int. Cl.
*G06F 13/42* (2006.01)
*G06F 13/12* (2006.01)
*H04L 9/30* (2006.01)
*H04L 9/06* (2006.01)

(52) U.S. Cl.
CPC .......... *G06F 21/602* (2013.01); *G06F 21/606* (2013.01); *H04L 63/164* (2013.01); *H04L 63/166* (2013.01); *H04L 63/168* (2013.01); *G06F 2213/0026* (2013.01); *H04L 9/0631* (2013.01); *H04L 9/302* (2013.01); *H04L 9/3066* (2013.01)

(56) References Cited

U.S. PATENT DOCUMENTS

| | | | | |
|---|---|---|---|---|
| 8,739,272 | B1* | 5/2014 | Cooper | H04L 63/0245 726/11 |
| 9,286,472 | B2* | 3/2016 | Dalal | G06F 13/1652 |
| 9,311,506 | B1* | 4/2016 | Riera | H04L 9/0861 |
| 2005/0251856 | A1* | 11/2005 | Araujo | H04L 63/123 726/12 |
| 2006/0123479 | A1* | 6/2006 | Kumar | H04L 63/0245 726/23 |
| 2008/0022094 | A1* | 1/2008 | Gupta | H04L 63/0485 713/165 |
| 2008/0271134 | A1* | 10/2008 | Johnson | H04L 63/02 726/13 |
| 2009/0063665 | A1* | 3/2009 | Bagepalli | H04L 63/166 709/222 |
| 2010/0131750 | A1* | 5/2010 | Pruss | H04L 63/0485 713/151 |
| 2011/0208867 | A1* | 8/2011 | Anthias | H04L 69/08 709/227 |
| 2014/0165196 | A1* | 6/2014 | Dalal | G06F 13/1652 726/23 |
| 2015/0113264 | A1* | 4/2015 | Wang | H04L 63/0823 713/151 |
| 2016/0352870 | A1* | 12/2016 | Manapragada | H04L 63/168 |
| 2017/0063808 | A1* | 3/2017 | Manapragada | H04L 67/2804 |
| 2017/0264554 | A1* | 9/2017 | Contavalli | H04L 47/22 |

OTHER PUBLICATIONS

Alshamsi, AbdelNasir, and Takamichi Saito. "A technical comparison of IPSec and SSL." 19th International Conference on Advanced Information Networking and Applications (AINA'05) vol. 1 (AINA papers). vol. 2. IEEE, 2005. (Year: 2005).*

Radivilova, Tamara, et al. "Decrypting SSL/TLS traffic for hidden threats detection." 2018 IEEE 9th International Conference on Dependable Systems, Services and Technologies (DESSERT). IEEE, 2018. (Year: 2018).*

* cited by examiner

SECURE COMMUNICATION ACCELERATION USING A SYSTEM-ON-CHIP (SOC) ARCHITECTURE

TECHNICAL FIELD

The present application relates to computer architecture, and more particularly, to a System-on-Chip (SoC) architecture for performing secure communication operations and method for performing secure communication operations using the SoC architecture.

BACKGROUND

Secure communication mechanisms such as Transport Layer Security (TLS) and Secure Sockets Layer (SSL) provide confidentiality and authenticity to the communication between two end points over a network. Secure communications over the Internet are important for many applications and have been widely adopted by websites.

TLS/SSL relies on public-key cryptographies to establish, in an asymmetric manner, a private session key agreed between two parties. This is also known as a handshaking process. Then, information can be securely communicated between the two parties using the private session key in a symmetric cryptography session. Both the symmetric and asymmetric ciphers used in TLS/SLL have tremendous performance overhead that can slow down the web hosting service by over 800%.

SUMMARY

In some aspects, the present disclosure is directed to an SoC for performing secure communication operations. The SoC may comprise a peripheral interface configured to communicate with a host system. The SoC may also comprise a network interface configured to receive network packets in a secure communication session. The SoC may further comprise a processor configured to execute an Operating System (OS) software and a secure communication software stack to process at least one received network packet in the secure communication session. In addition, the SoC may comprise a secure communication engine configured to perform cryptographic operations and generate at least one decrypted packet in the secure communication session. The at least one decrypted packet may be provided to the host system via the peripheral interface.

In some other aspects, the present disclosure is directed to a hardware computer peripheral card for performing secure communication operations. The hardware computer peripheral card may comprise a hardware connector configured to be coupled with a host system. The hardware computer peripheral card may also comprise an SoC. The SoC may comprise a peripheral interface configured to communicate with the host system through the hardware connector. The SoC may also comprise a network interface configured to receive network packets in a secure communication session. The SoC may further comprise a processor configured to execute an Operating System (OS) software and a secure communication software stack to process at least one received network packet in the secure communication session. In addition, the SoC may comprise an secure communication engine configured to perform cryptographic operations and generate at least one decrypted packet in the secure communication session. The at least one decrypted packet may be provided to the host system via the peripheral interface.

In some aspects, the present disclosure is directed to a method, conducted by an SoC coupled to a host system, of performing secure communication operations. The method may comprise receiving, by a network interface of the SoC, a network packet from a client device. The method may also comprise determining whether the received network packet is a secure communication packet. The method may further comprise sending the secure communication packet to a secure communication software stack executed on the SoC, in response to the determination that the network packet is a secure communication packet. In addition, the method may comprise establishing, by the secure communication software stack executed on the SoC, a secure communication session between the client device and the host system based on the secure communication packet through a handshaking process.

In further aspects, the present disclosure is directed to a method, conducted by an SoC coupled to a host system, of performing secure communication operations. The method may comprise receiving, by a network interface of the SoC, a network packet from a client device. The method may also comprise determining whether the received network packet is a secure communication packet. The method may further comprise sending the secure communication packet to a secure communication software stack executed on the SoC, in response to the determination that the received network packet is a secure communication packet. The method may also comprise forwarding, by the secure communication software stack, one or more parameters associated with the secure communication packet to a secure communication engine of the SoC. The method may also comprise decrypting, by the secure communication engine, the secure communication packet according to one or more crypto algorithms to generate a decrypted network packet. In addition, the method may comprise sending the decrypted network packet to the host computer via a peripheral interface.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Figure 1:
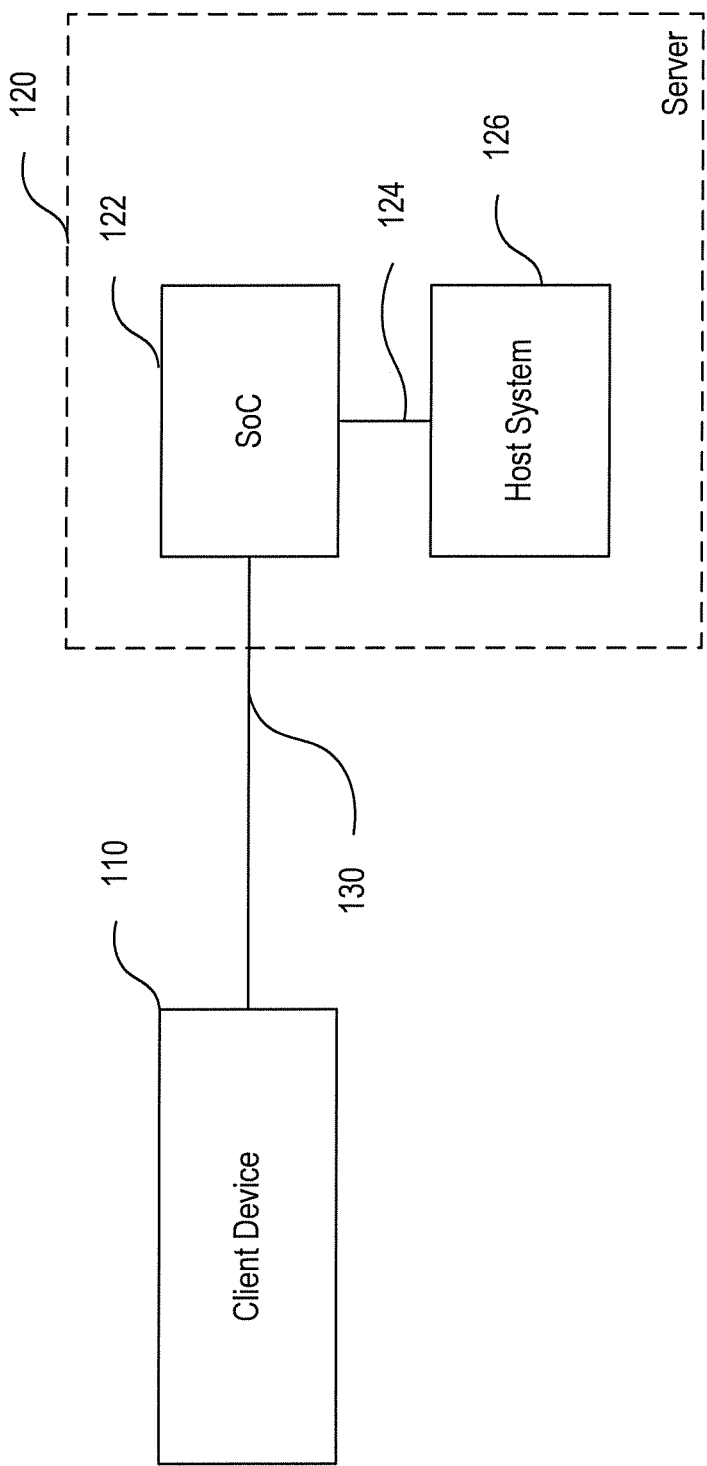
FIG. 1 a schematic diagram of a client-server system that includes an exemplary SoC for performing secure communication operations, in accordance with some embodiments disclosed in this application.

Reference will now be made in detail to exemplary embodiments of the invention, examples of which are illustrated in the accompanying drawings. When appropriate, the same reference numbers are used throughout the drawings to refer to the same or like parts.

Secure communication mechanisms such as Transport Layer Security (TLS) and Secure Sockets Layer (SSL) are cryptographic protocols that provide confidentiality and authenticity to the communication between two end points over a network. As used herein, TLS refers to a cryptographic protocol that provides data integrity and authenticity to two communicating computer systems. TLS and its predecessor, SSL, are at large interchangeable terms with respect to the embodiments described herein. In the following description, TLS and SSL are treated as interchangeable with each other and it is appreciated that the embodiments can also be applicable to subsequent cryptographic protocols. TLS operations often constitute the substrate of HTTPS support for web hosting service. TLS creates a new layer between the application layer (e.g., a web server normally operates in the application layer) and the Transmission Control Protocol/Internet Protocol (TCP/IP) layer of the traditional network stack. TLS can provide encryption and decryption for the network packets (often in plain text) transferred over the TCP/IP layer to protect against eavesdropping and/or tampering to the network packets.

Application layer services such as HTTPS are often built on top of TLS to establish their trusted substrate. As of today, over 43% of the entire websites over the Internet are protected with HTTPS. Open Secure Sockets Layer (OpenSSL) is perhaps the most widely used software implementation of TLS and has been adopted by many Internet entities.

TLS utilizes public-key cryptographies, such as RSA (refers to the crypto algorithm developed by Rivest, Shamir and Adleman) and/or Elliptic Curve (EC), to establish a private session key agreed between two parties through an asymmetric handshaking process. Then, the private session key can be used in the follow-on symmetric cryptography session using cryptographic algorithms such as Advanced Encryption Standard (AES). As described in the Background session, both the symmetric and asymmetric ciphers used in TLS have tremendous performance overhead that can slow down the web hosting service significantly.

The present application discloses systems, apparatuses, and methods to comprehensively relieve the performance overhead of secure communication mechanisms such as TLS. Embodiments of the present application include a hardware computer peripheral card configured to be coupled with a host system, which may host a web server. The hardware computer peripheral card may include an SoC having an architecture that is capable of handling almost all secure communication operations. Accordingly, instead of the host system handling these secure operations, these operations have been offloaded to the SoC, thereby improving the overall system performance by increasing the speed and efficiency of the secure communications.

FIG. 1 is a schematic diagram of a client-server system that includes an exemplary SoC for performing secure communication operations, in accordance with some embodiments disclosed in this application. Referring to FIG. 1, a client device 110 may connect to a server 120 through a communication channel 130. Communication channel 130 may be secured using a secure communication mechanism such as TLS. Server 120 may include a host system 126 and an SoC 122. Host system 126 may include a web server, a cloud computing server, or the like. SoC 122 may be coupled to host system 126 through a connection interface 124. Connection interface 124 may be based on a parallel interface (e.g., Peripheral Component Interconnect (PCI) interface), a serial interface (e.g., Peripheral Component Interconnect Express (PCIe) interface), etc. TLS related secure communication operations, often computationally intensive, may be performed by SoC 122. As a result, the performance overhead normally imposed on host system 126 can be relieved by offloading the secure communication operations to SoC 122. Communications between SoC 122 and host system 126 may be plain text-based, while communications between server 120 and client device 110 may be encrypted and secured by operation of SoC 122.

Figure 2:
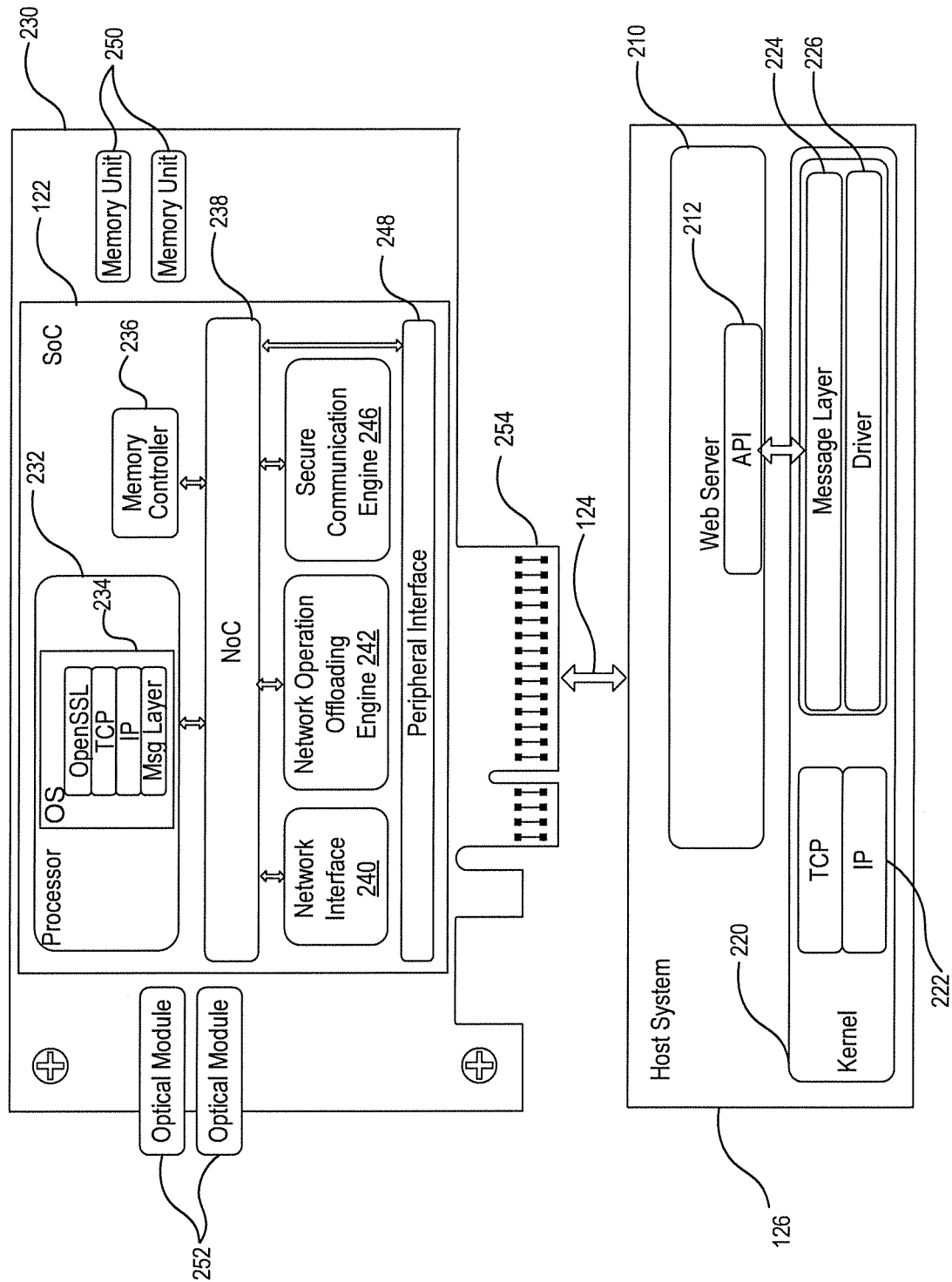
FIG. 2 is a schematic diagram of an exemplary implementation of a server, in accordance with some embodiments disclosed in this application.

FIG. 2 is a schematic diagram of an exemplary implementation of server 120, in accordance with some embodiments disclosed in this application. Referring to FIG. 2, SoC 122 may be provided on a hardware computer peripheral card 230 (also referred to as "peripheral card 230" for simplicity). For example, SoC 122 may be soldered on or plugged in to a socket of peripheral card 230. Peripheral card 230 may include a hardware connector 254 configured to be coupled with host system 126. For example, peripheral card 230 may be in the form of a PCI card, a PCIe card, etc., that is plugged onto a circuit board of host system 126.

Peripheral card 230 may include an on-board memory system such as memory units 250. Memory units 250 may be accessible by SoC 122 to facilitate secure communication operations. Peripheral card 230 may also include an external communication interface such as optical modules 252 (e.g., using optical/fiber signals at the input of peripheral card 230) to communicate with external devices such as client device 110. Non-optical communication methods such as metal-based communication interfaces may also be used to communicate with external devices.

SoC 122 may include a processor 232, a memory controller 236, a Network-on-Chip (NoC) 238, a network interface 240, a network operation offloading engine 242, a secure communication engine 246, and a peripheral interface 248. These hardware components may be integrated into SoC 122 as a single chip, or one or more of these hardware components may be in the form of independent hardware devices.

Processor 232 may be implemented as a Central Processing Unit (CPU). Processor 232 may execute a full-blown Operating System (OS) software 234 such as Linux based OS software. The kernel of OS software 234 may include a network software stack such as TCP/IP stack. The kernel of OS software 234 may also include a message layer software stack to communicate with host system 126. In the user space, OS software 234 may include a secure communication software stack such as OpenSSL.

Memory controller 236 may control local memories such as memory units 250 to facilitate the functionality of processor 232. For example, memory controller 236 may control access of data stored on memory units 250 by processor 232.

Network interface 240 may provide a communication data path that implements Layer 1 (L1) and Layer 2 (L2) network stack. For example, network interface 240 may be configured to receive network packets from client device 110 through communication channel 130. When communication channel 130 is secured by TLS, the network packets may be encrypted.

NoC 238 may provide a high-speed on-chip interconnect that connects together the various hardware components on SoC 122.

Network operation offloading engine 242 may facilitate the operating speed of kernel TCP/IP or other L3/L4 network software stacks. For example, network operation offloading engine 242 may establish a TCP session between client device 110 and server 120 to receive network packets from client device 110. Then, network operation offloading engine 242 may inspect a destination port of each receive network packet to identify one or more secure communication packets. For example, if the port number does not match any of the preprogrammed secure communication protocol ports (e.g., 587 for TLS, 443 for SSL, etc.), then network operation offloading engine 242 may forward the network packet to host system 126. On the other hand, if the port number matches a preprogrammed secure communication protocol port, indicating that the network packet may be a secure communication packet, then network operation offloading engine 242 may forward the network packet to processor 232 for processing via NoC 238. In some embodiments, network operation offloading engine 242 may further inspect an application layer payload associated with the network packet before forwarding the network packet to processor 232. For example, network operation offloading engine 242 may decapsulate a record header associated with the application layer payload to determine whether the network packet has a legitimate secure communication protocol record header, such as an SSL record header. In this way, network operation offloading engine 242 can filter the received network packets and only forward network packets that have a valid destination port and/or a legitimate secure communication protocol record header to processor 232 for processing, while forward other network packets that are likely not encrypted to host system 126.

Secure communication engine 246 may include hardware implementation of one or more ciphers, such as RSA, EC, and AES, to perform high-speed cryptographic operations. Encryption and decryption operations, which are usually computational intensive, may be performed by secure communication engine 246. For example, after a network packet is forwarded to processor 232 for processing, processor 232 may determine whether an encryption, decryption, or digital signature algorithm needs to be performed. If so, processor 232 may offload the computation to one or more ciphers of secure communication engine 246. Secure communication engine 246 will be described in greater detail in reference to FIG. 3.

Peripheral interface 248 may include an implementation of a peripheral communication protocol such as PCIe protocol. For example, peripheral interface 248 may include a PCIe core to facilitate communication between SoC 122 and host system 126 according to the PCIe protocol.

Host system 126 may run an OS (not shown) having a kernel 220. Kernel 220 may include a TCP/IP stack 222. Comparing to the network software stack included in OS 234 running on processor 232, the TCP/IP stack 222 may be a simplified version that does not include the extra software for handling handshaking network packets during a handshaking phase of a secure communication session. As a result, the overhead associated with TCP/IP stack for handling handshaking network packets can be relieved by offloading the handshaking tasks to SoC 122.

Kernel 220 may also include a driver 226, such as a PCIe driver, for interfacing with peripheral card 230. Kernel 220 may also include a message layer software stack 224 to facilitate communication with the software stack of OS 234 running on processor 232. In the user space, host system 126 may host a web server 210 such as a Nginx or Apache web server. Web server 210 may include an Application Programming Interface (API) configured to interface with message layer software stack 224 and communicate with the secure communication software stack (e.g., OpenSSL) of OS 234 running on processor 232 through message layer software stack 224. Web server 210 may also use the API to initialize and configure the secure communication software stack running on processor 232.

Figure 3:
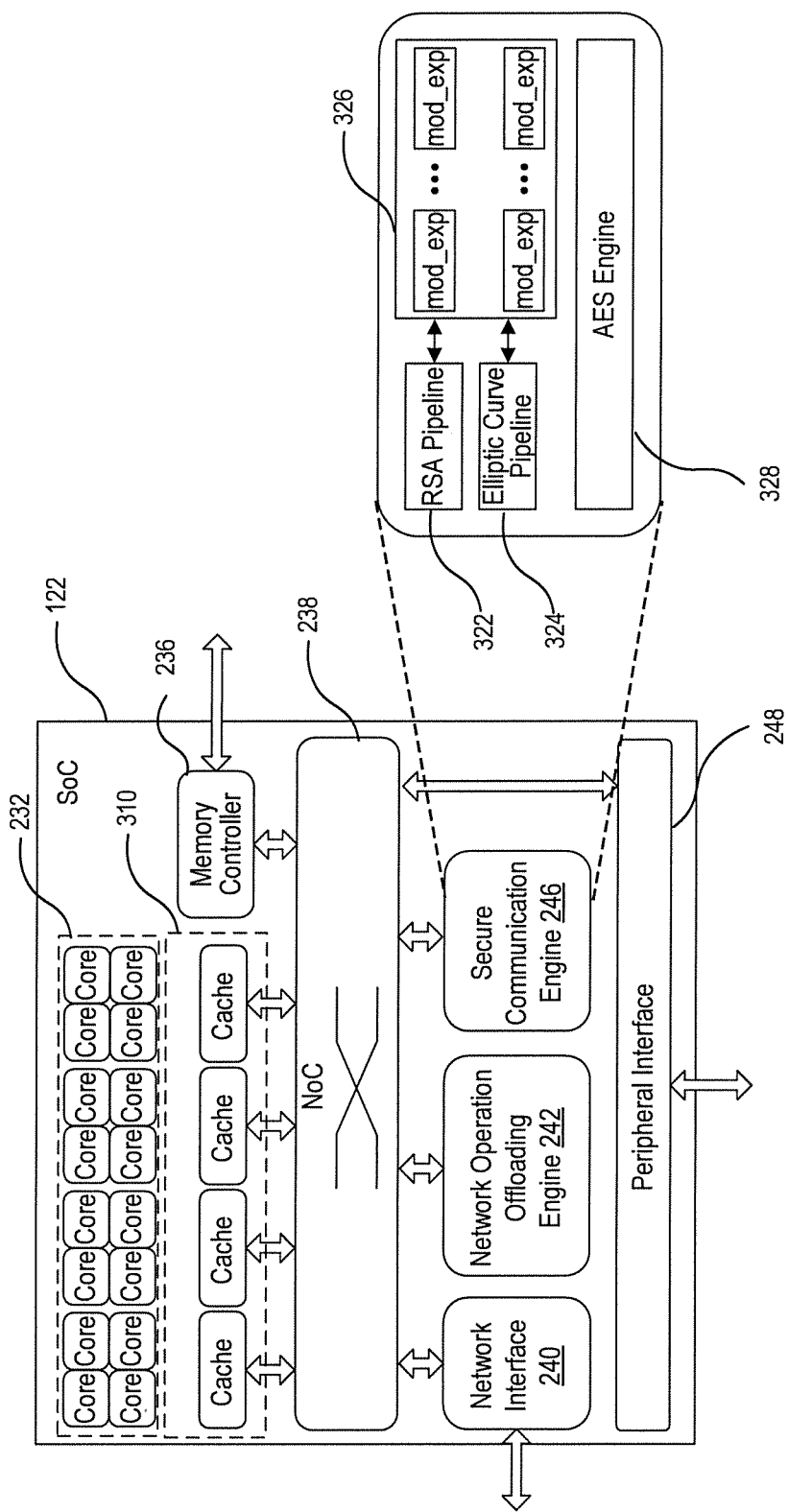
FIG. 3 shows an example implementation of an SoC, according to some embodiments of the present application.

FIG. 3 shows an example implementation of SoC 122, according to some embodiments of the present application. Compared to FIG. 2, FIG. 3 shows an exemplary hardware implementation of processor 232, as well as an exemplary implementation of secure communication engine 246. Referring to FIG. 3, processor 232 may include a plurality of cores to facilitate multi-thread, parallel processing of secure communication operations. The plurality of cores may interface with NoC 238 through a cache system 310 that may include multiple levels of caches.

Secure communication engine 246 may include one or more public-key and private-key ciphers. For example, secure communication engine 246 may include an RSA pipeline 322 and an Elliptic Curve pipeline 324 to perform cryptographic operations according to RSA and EC algorithms, respectively. Since both RSA and EC rely heavily on exponential modular arithmetic, RSA pipeline 322 and EC pipeline 324 may share an array of high-speed, high-radix exponential modular (mod_exp) units 326. Secure communication engine 246 may also include an AES engine 328 to perform cryptographic operations according to AES algorithm. To support high concurrency web servers that may have a large number of connections, RSA, EC, and AES engines may have many replicas in hardware.

Figure 4:
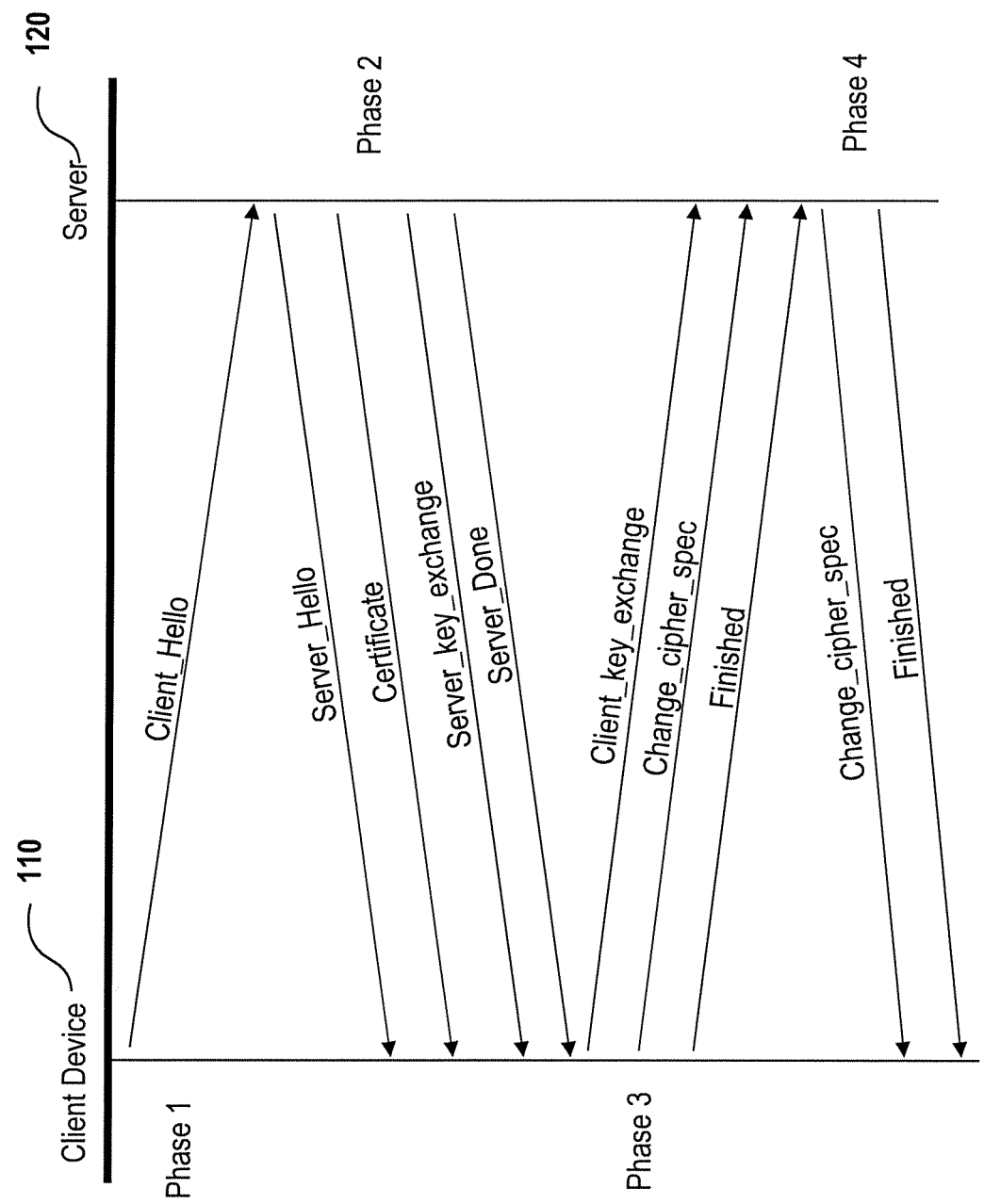
FIG. 4 shows an exemplary sequence of a secure communication handshaking process, according to some embodiments of the present application.
Figure 5:
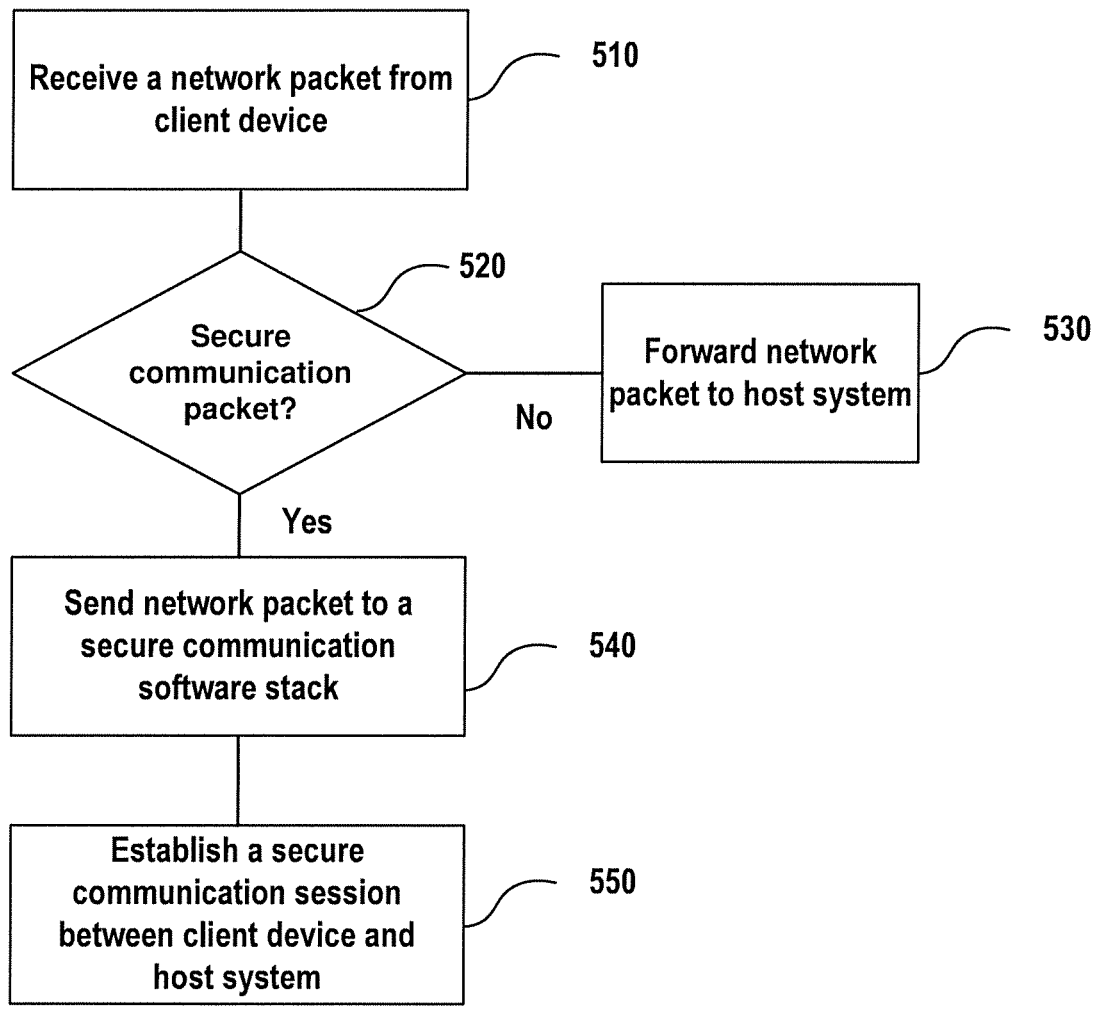
FIG. 5 a flow chart of an exemplary method of performing the handshaking process shown in FIG. 4 using embodiments of the present application.

FIG. 4 shows an exemplary sequence of a secure communication handshaking process, and FIG. 5 is a flow chart of an exemplary method 500 of performing the handshaking process using embodiments of the present application. As used herein, secure communication handshaking refers to a process for server 120 and client device 110 to authenticate each other and reach an agreement on a private session key. In other words, the handshaking is a process of establishing a secure communication session between server 120 and client device 110. Once the handshaking process is accomplished, the communication session between server 102 and client device 110 onwards can be encrypted using that private session key.

Referring to FIG. 4, in Phase 1, client device 110 sends a Client_Hello message to server 120. The Client_Hello message may include an SSL version number that client device 110 supports, a client side random number Rc, a cipher suite and compression methods that client device 110 supports.

In Phase 2, server 120 receives one or more network packets of the message sent from client device 110 (corresponding to step 510 shown in FIG. 5). For example, the network packet(s) may be received by network interface 240 of SoC 122. SoC 122 may then determine, for example using network operation offloading engine 242, whether the received network packet(s) are secure communication packet(s) in step 520 shown in FIG. 5. As described above, network operation offloading engine 242 may determine whether a network packet is a secure communication packet based on a destination port of the network packet and/or a record header associated with an application layer payload associated with the network packet. If it is determined that a received network packet is not a secure communication packet (the NO branch of step 520), then network operation offloading engine 242 may forward the network packet to host system 126 in step 530. Otherwise (the YES branch of step 520), network operation offloading engine 242 may forward the network packet to secure communication software stack (e.g., OpenSSL) running on processor 232 of SoC 122 (step 540).

Server 120 may then respond with a Server_Hello message. The Server_Hello message may include the SSL version number, a server side random number Rs, the cipher suites and compression methods server 120 supports. The server response may also include the server's certificate (Certificate) that contains the public key (e, n), as well as messages for key exchange (Server_key_exchange). Finally, server 120 may respond a Server_Done message indicating the end of the Server_Hello and its associated messages.

In Phase 3, client device 110 may authenticate the server's certificate and then send a pre_master_secret, as well as messages for key exchange (Client_key_exchange) and cipher specification (Change_cipher_spec) to server 120. A Finished message indicates the end of the client side negotiation. This series of messages are encrypted with the server's public key by calculating msg^e mod n.

In Phase 4, server 120 may decrypt the client's message using its private key (d, n) by calculating msg^d mod n. The cryptographic calculation may be performed by secure communication engine 246. Then, server 120 may respond with a message for cipher specification (Change_cipher_spec) and a Finished message. At this point, server 120 and client device 110 have reached an agreement on pre_master_secret and can both derive the same session key master_secret using Pseudo Random Function (PRF), thereby establishing a secure communication session between client 110 and server 120 (step 550 shown in FIG. 5). The secure session between client device 110 and server 120 onwards will be encrypted using the session key master_secret and the private-key cipher (such as AES) agree upon.

Figure 6:
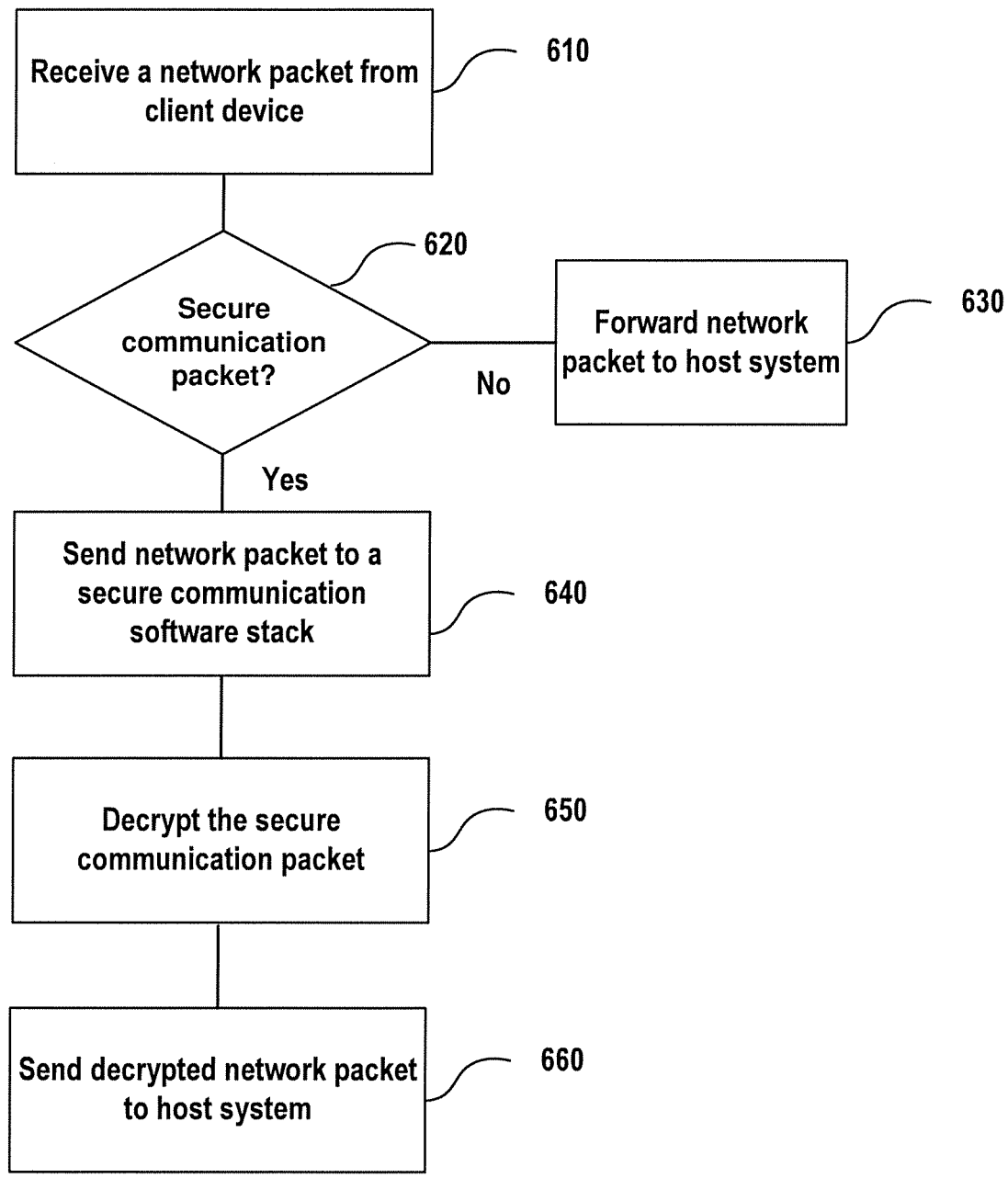
FIG. 6 is a flow chart of an exemplary method of performing secure communication operations in an established secure session, according to some disclosed embodiment.

FIG. 6 is a flow chart of an exemplary method 600 of performing secure communication operations in an established secure session, according to some disclosed embodiment. Method 600 may be performed following step 550. In step 610, network interface 240 may receive a network packet from client device 110. The packet may go through the MAC layer of network interface 240 and is then forwarded to network operation offloading engine 242. In step 620, network operation offloading engine 242 may determine whether the network packet is a secure communication packet based on its destination port and/or a record header associate with its application layer payload, forward the network packet to either host system 126 (step 630) or the secure communication software stack (e.g., OpenSSL) running on processor 232 (step 640), similar to steps 520, 530, and 540 described above. After the secure communication packet is sent to the secure communication software stack, processor 232 may offload the computation of decryption to secure communication engine 246 to decrypt the secure communication packet and generate a decrypted network packet. For example, the computation may be performed by one of the available ciphers in secure communication engine 246. Secure communication engine 246 may send an interrupt on NoC 238 to inform processor 232 of the completion of the computation. In step 660, processor 232 may send the decrypted network packet to host system 126 via peripheral interface 248. For example, processor 232 may execute the OpenSSL software stack to send the decrypted network package to web server 210 through message layer 224.

Embodiments of the present application can improve the server performance in a cloud computing or web hosting environment, as well as reducing the total cost of ownership.

The specification has described an SoC architecture for accelerating secure communication speed between a client device and a server. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined as long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Embodiments of the present application may be implemented using hardware, software, firmware, or any combination thereof for allowing a specialized device to perform the functions described above. One or more steps, operations, functions, and modules described herein may be implemented by firmware instructions or codes stored in one or more memory devices and executed by one or more hardware processor devices. Exemplary hardware processor devices include logic gate circuitry configured or made to perform data processing and/or logic operations, integrated circuits (ICs) designed and made to perform specific functions, programmable gate arrays (PGAs), field-programmable gate arrays (FPGAs), etc.

Multiple function modules may be integrated into a single physical device, or may be provided in separate physical devices.

It is intended that the disclosure and examples be considered as exemplary only, with a true scope and spirit of disclosed embodiments being indicated by the following claims.

What is claimed is:

1. A System-on-Chip (SoC) for performing secure communication operations, the SoC comprising:
   a peripheral interface configured to communicate with a host system;

a network interface configured to receive network packets in a secure communication session;

a processor configured to execute an Operating System (OS) software and a secure communication software stack to process at least one received network packet in the secure communication session;

a secure communication engine configured to perform cryptographic operations and generate at least one decrypted packet in the secure communication session, wherein the at least one decrypted packet is provided to the host system via the peripheral interface; and a network operation offloading engine configured to:
identify at least one secure communication packet from the network packets received by the network interface by decapsulating a record header associated with an application layer payload of the network packets to determine whether the network packets have a legitimate secure communication protocol record header, and forward the identified at least one secure communication packet to the processor for processing a decryption operation on the identified at least one secure communication packet in response to a determination that the identified at least one secure communication packet has a legitimate secure communication protocol record header, wherein the secure communication engine is configured to decrypt the identified at least one secure communication packet in response to a determination by the processor that the decryption operation is to be performed on the identified at least one secure communication packet.

2. The SoC of claim 1, wherein the OS software includes a network software stack and the processor is configured to execute the network software stack to process the at least one received network packet in the secure communication session.

3. The SoC of claim 2, wherein the network software stack includes a Transmission Control Protocol/Internet Protocol (TCP/IP) software stack, and the processor is configured to execute the TCP/IP software stack to process the at least one received network packet and deliver the processed at least one network packet to the secure communication software stack.

4. The SoC of claim 1, wherein the network operation offloading engine is further configured to identify the at least one secure communication packet by inspecting a destination port of each network packet received by the network interface.

5. The SoC of claim 2, wherein the processor is configured to execute the network software stack to process handshaking packets during a handshaking process in the secure communication session.

6. The SoC of claim 1, wherein the secure communication software stack includes an Open Secure Sockets Layer (OpenSSL) software stack.

7. The SoC of claim 1, wherein the peripheral interface includes a Peripheral Component Interconnect Express (PCIe) interface.

8. The SoC of claim 1, wherein the secure communication engine includes at least one of an RSA cipher, an Elliptic Curve (EC) cipher, or an Advanced Encryption Standard (AES) cipher.

9. A hardware computer peripheral card for performing secure communication operations, the hardware computer peripheral card comprising:

a hardware connector configured to be coupled with a host system; and a System-on-Chip (SoC), comprising:
a peripheral interface configured to communicate with the host system through the hardware connector;

a network interface configured to receive network packets from a client device in a secure communication session;

a processor configured to execute an Operating System (OS) software and a secure communication software stack to process at least one received network packet in the secure communication session;

a secure communication engine configured to perform cryptographic operations and generate at least one decrypted packet in the secure communication session, wherein the at least one decrypted packet is provided to the host system via the peripheral interface; and a network operation offloading engine configured to:
identify at least one secure communication packet from the network packets received by the network interface by decapsulating a record header associated with an application layer payload of the network packets to determine whether the network packets have a legitimate secure communication protocol record header, and forward the identified at least one secure communication packet to the processor for processing a decryption operation on the identified at least one secure communication packet in response to a determination that the identified at least one secure communication packet has a legitimate secure communication protocol record header, wherein the secure communication engine is configured to decrypt the identified at least one secure communication packet in response to a determination by the processor that the decryption operation is to be performed on the identified at least one secure communication packet.

10. The hardware computer peripheral card of claim 9, wherein the peripheral interface includes a Peripheral Component Interconnect Express (PCIe) interface and the hardware connector includes a PCIe connector.

11. A method, conducted by a System-on-Chip (SoC) coupled to a host system, of performing secure communication operations, the method comprising:

receiving, by a network interface of the SoC, a network packet from a client device;

determining whether the received network packet is a secure communication packet by decapsulating a record header associated with an application layer payload of the received network packet to determine whether the received network packet has a legitimate secure communication protocol record header;

in response to the determination that the network packet is a secure communication packet and that the network packet has a legitimate secure communication protocol record header, sending the secure communication packet to a secure communication software stack executed on the SoC;

decrypting the network packet by the secure communication software stack executed on the SOC; and establishing, by the secure communication software stack executed on the SoC, a secure communication session between the client device and the host system based on the secure communication packet through a handshaking process.

12. The method of claim 11, comprising:
determining whether the network packet is a secure communication packet based on a destination port of the received network packet.

13. The method of claim 11, comprising:
decrypting, by the secure communication engine, encrypted network packets received from the client device in the established secure communication session; and
sending the decrypted network packets to the host system.

14. The method of claim 13, comprising:
sending the decrypted network packets to the host system through a Peripheral Component Interconnect Express (PCIe) interface.

15. The method of claim 11, wherein performing the cryptographic operations using the secure communication engine comprises:
performing the cryptographic operations according to at least one of an RSA algorithm, an Elliptic Curve (EC) algorithm, or an Advanced Encryption Standard (AES) algorithm.

16. A method, conducted by a System-on-Chip (SoC) coupled to a host system, of performing secure communication operations, the method comprising:
receiving, by a network interface of the SoC, a network packet from a client device;
determining whether the received network packet is a secure communication packet by decapsulating a record header associated with an application layer payload of the received network packet to determine whether the received network packet has a legitimate secure communication protocol record header;
in response to the determination that the received network packet is a secure communication packet and that the network packet has a legitimate secure communication protocol record header, sending the secure communication packet to a secure communication software stack executed on the SoC;
forwarding, by the secure communication software stack, one or more parameters associated with the secure communication packet to a secure communication engine of the SoC;
decrypting, by the secure communication engine, the secure communication packet according to one or more crypto algorithms to generate a decrypted network packet; and
sending the decrypted network packet to the host computer via a peripheral interface.

* * * * *